R. A. SMITH.
FLEXIBLE COUPLING.
APPLICATION FILED AUG. 4, 1919.

1,368,662.

Patented Feb. 15, 1921.

Inventor
Robert A. Smith
By his Attorney
Harry L. Duncan

UNITED STATES PATENT OFFICE.

ROBERT A. SMITH, OF MAHWAH, NEW JERSEY, ASSIGNOR TO SMITH AND SERRELL, OF MAHWAH, NEW JERSEY, A COPARTNERSHIP CONSISTING OF ROBERT A. SMITH AND JOHN J. SERRELL.

FLEXIBLE COUPLING.

1,368,662.

Specification of Letters Patent.  Patented Feb. 15, 1921.

Application filed August 4, 1919. Serial No. 315,060.

*To all whom it may concern:*

Be it known that I, ROBERT A. SMITH, a citizen of the United States, and resident of Mahwah, Bergen county, State of New Jersey, have made a certain new and useful Invention Relating to Flexible Couplings, of which the following is a specification, taken in connection with the accompanying drawing, which forms part of the same.

This invention relates especially to resilient pin flexible couplings in which the coöperating coupling members, which may comprise flange coupling members adapted to be connected to the shafts and also in some cases an intermediate floating ring coupling member, are formed with bearing holes preferably provided with Babbitt or other bearing metal cast-in linings so as to give more efficient bearing contact with the resilient coupling pins of any suitable form that are loosely or slidably mounted in these holes to yieldingly connect the coupling members. Cored or other rough recesses may be cast or otherwise formed in these coupling members and suitable mandrels which may be of expanding rectangular sectioned character may be accurately located in these recesses by coöperating jig plates or locating devices engaging the coupling members, and then the bearing metal may be cast or otherwise forced into the recesses to form accurately spaced and shaped linings therein which may be securely and permanently retained in position. It is advantageous to use resilient coupling pins comprising one or more spring elements and preferably having bearing portions or plates of a relatively rigid character riveted or otherwise connected on one or both sides of the leaf spring which may be used and thus give more desirable bearing contact between the coöperating bearing holes and the end or other portions of the coupling members. In this way the resilient coupling pins are materially simplified and improved and by forming one or more of these bearing plates with lateral projecting securing flanges, bolt seats or other portions may be provided therein so as to be engaged by securing bolts and thereby held in position in the coöperating coupling member.

In the accompanying drawing showing in a somewhat diagrammatic way illustrative embodiments of this invention, Figure 1 is a longitudinal section through one form of shaft coupling embodying this invention.

Figure 1:
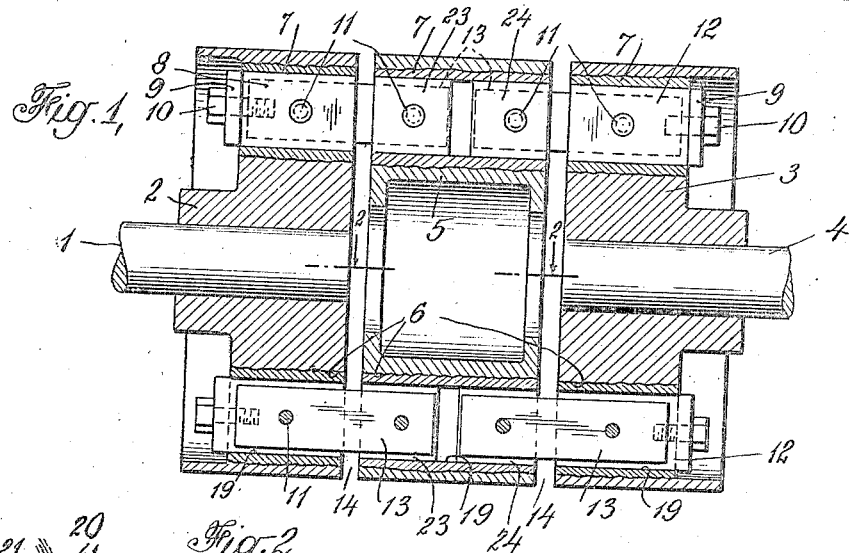

In the illustrative form of coupling shown in Fig. 1 flange coupling member 2, 3, may be formed with keyed or other holes so as to be connected to the shafts 1, 4, and these coupling members may be formed with coöperating bearing holes of rectangular or other suitable cross-section to accommodate the resilient coupling pins employed, these holes preferably having a Babbitt metal or other cast-in lining 7 within the cored out or rough recesses 6 originally formed in the coupling members. It is of course understood that the coupling pins may bridge directly across the coöperating bearing holes in these flange coupling members, or if desired, an interposed floating ring coupling member 5 may be used between them formed with similarly spaced holes so that the resilient coupling pins may yieldingly connect the adjacent coupling members so as to give a still greater degree of yield between the two shafts.

Figure 2:
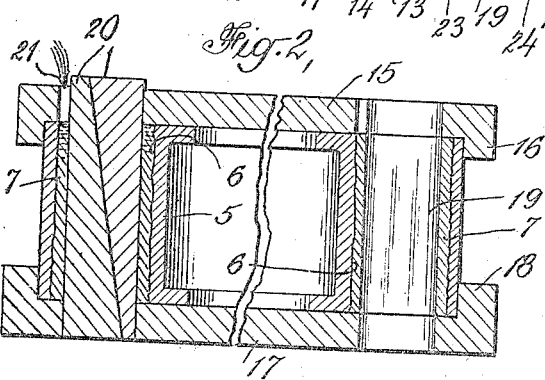
Fig. 2 is a transverse section through one of the coupling members taken substantially along the line 2—2 of Fig. 1 illustrating the way in which the cast-in linings may be formed.
Figure 3:
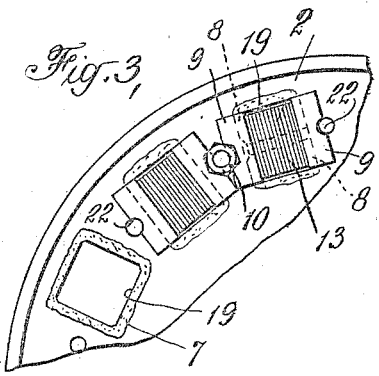
Fig. 3 is a partial side view.
Figure 4:
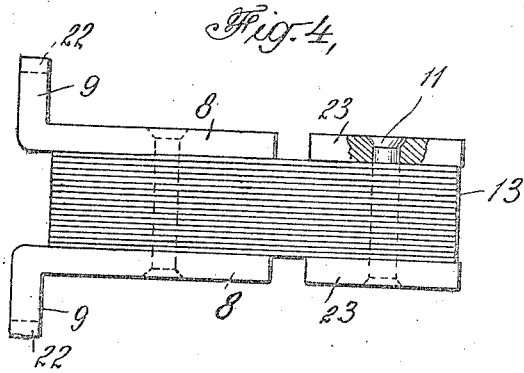
Fig. 4 is an enlarged detail showing one of the coupling pins, parts being shown in section.

These coupling members may originally be cast with enlarged cored out or roughly shaped recesses 6 generally corresponding in number and location to the holes for the coupling pins and then Babbitt metal or other suitable relatively fusible bearing metal linings may be cast, forced or otherwise located within these recesses so as to properly position and shape the holes for the coupling pins. As indicated in Fig. 2, one of these coupling members 5 may have a bottom casting jig or plate 17 arranged in connection therewith and accurately located with respect thereto by a locating flange or member 18, while a similar top plate 15 may have a locating flange or series of projections 16 similarly engaging the periphery of this coupling member. Suitable mandrels may extend through the holes in these plates so as to thus be accurately positioned with respect to the coupling member, and for instance, rectangular sectioned expanding mandrels 20 may be located in one or more of these recesses, a pouring or feeding opening 21 being left through which Babbitt or other bearing metal may be cast or forced into the recesses around these mandrels so as to form accurately positioned and sized linings 7 for the coupling pins. After such linings are cast or formed the plates 15, 17 may be removed and then the mandrels may be taken out after in some cases first compressing the linings by slightly expanding the mandrels so as to form compressed bearing faces 19 against which the coupling pins may engage and thus also more securely unite the linings to the coupling members. In this way rectangular sectioned holes may be formed for these resilient coupling pins and also a better and more efficient operation of the couplings secured because of the reduction of friction between these parts, especially under extreme conditions of lubrication.

Figure 5:
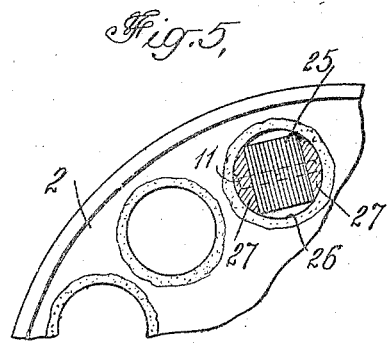
Fig. 5 is a side view showing a different form of coupling pin and bearing hole.

By making rectangular or square sectioned holes in these coupling members the resilient coupling pins may be given a rectangular section so that a considerably more efficient arrangement of the leaf springs 13 may be secured. It is also possible under these conditions to use separate bearing plates riveted or otherwise connected to the leaf springs adjacent the ends of the pins where a more rigid bearing surface is desired to engage the coupling members. For this purpose the bearing plates 8, 23 may be riveted or secured to the leaf springs 13 as by the countersunk head rivets 11 so that a substantially flat bearing surface is thus readily provided which may be pressed, ground or otherwise finished so as to give the particular character most desirable for efficient operation. With this arrangement it is also possible to form laterally projecting securing flanges 9 on one or more of these bearing plates so that these securing flanges which may be formed with bolt seats 22 may be engaged by securing bolts, such as 10, screwed into the coupling bearing member so that these resilient coupling pins are reliably held in position therein. It is of course understood that the longitudinal extent of these bearing plates depends upon the particular character of coupling employed, relatively less free space being provided between these relatively rigid bearing plates in the double or floating ring type of coupling shown in Fig. 1, and this free length of the springs may even approach the spaces 14 between the coöperating coupling members in some cases. A considerably greater length of the exposed yielding leaf springs is usually employed in the single type of coupling where the flange coupling members secured to the shafts are directly connected by a single set of such coupling pins. As illustrated in Fig. 5, cylindrical holes for this general type of resilient coupling pins may be formed with cast-in Babbitt or other bearing metal linings and these linings 26 may be formed around accurately positioned or located mandrels as previously explained. The resilient coupling pins for such service may, for example, have the leaf springs 25 to which may be riveted or otherwise connected the relatively rigid convex bearing plates 27 held together at each end of the coupling pins as by one or more rivets 11 so as to form cylindrical surfaces to properly engage the coöperating bearing holes in the coupling members and these end portions of the resilient coupling pins may of course be ground or otherwise finished so as to be accurately and properly sized for this service.

This invention has been described in connection with a number of illustrative embodiments, forms, proportions, parts, shapes, materials, arrangements and methods of manufacture and use, to the details of which disclosure the invention is not of course to be limited, since what is claimed as new and what is desired to be secured by Letters Patent is set forth in the appended claims:

1. In yieldable shaft couplings, flange coupling members adapted to be connected to shafts, an interposed floating ring coupling member, there being a series of rectangular sectioned coöperating holes in said members and provided with sized Babbitt metal linings, and resilient coupling pins each comprising a series of leaf springs and relatively rigid outer bearing plates adjacent the ends of said pins to bear against the opposite faces of each of said holes, one of said bearing plates having a projecting securing flange, and securing bolts to hold said securing flanges in place on one of said flange coupling members.

2. In yieldable shaft couplings, coupling members adapted to be connected to shafts, there being a series of rectangular sectioned coöperating holes in said members and resilient coupling pins each comprising a series of leaf springs and relatively rigid outer bearing plates adjacent the ends of said pins to bear against the opposite faces of each of said holes, one of said bearing plates having a projecting securing flange, and securing bolts to hold said securing flanges in place on one of said coupling members.

3. In yieldable shaft couplings, cast metal coupling members adapted to be connected to shafts and formed with a series of enlarged rough cored coöperating recesses, Babbitt metal linings cast into and retained in said recesses and forming a series of alined and sized rectangular sectioned coöperating holes in said members and regularly spaced circumferentially around them and resilient coupling pins each comprising a series of leaf springs and relatively rigid outer bearing portions adjacent the ends of said pins to bear against the inner faces of said holes.

4. In yieldable shaft couplings, coupling members adapted to be connected to shafts, an interposed floating ring coupling member, a series of rectangular sectioned coöperating holes formed in some of said members and provided with sized cast-in Babbitt metal linings and resilient coupling pins each comprising a series of leaf springs and relatively rigid outer bearing portions adjacent the ends of said pins to bear against the opposite faces of each of said holes.

5. In yieldable shaft couplings, coupling members adapted to coöperate with shafts, a series of rectangular sectioned coöperating holes formed in some of said members and provided with cast-in bearing metal linings and resilient coupling pins each comprising relatively rigid outer bearing portions adjacent the ends of said pins to bear against the opposite faces of each of said holes.

6. In yieldable shaft couplings, coupling members adapted to coöperate with shafts, and comprising an intermediate floating ring coupling member, a series of coöperating holes formed in each of said members and provided with cast-in bearing metal linings and resilient coupling elements each comprising a series of leaf springs and relatively rigid outer bearing portions to engage said holes.

7. In yieldable shaft couplings, coupling members adapted to coöperate with shafts, a series of coöperating holes formed in some of said members and provided with cast-in bearing metal linings and resilient coupling elements each comprising bearing portions to engage said holes.

8. In yieldable shaft couplings, a resilient coupling pin comprising a series of leaf springs and relatively rigid outer bearing plates riveted to said springs to form rectangular sectioned portions adjacent the ends of said pin, some of said bearing plates having laterally projecting securing flanges adapted to hold said coupling pin in place in a coupling member.

9. In yieldable shaft couplings, cast metal coupling members adapted to be connected to shafts and formed with a series of enlarged rough coöperating recesses, bearing metal linings cast into and retained in said recesses and forming a series of alined rectangular sectioned coöperating holes in said members and resilient coupling pins each comprising a series of leaf springs and relatively rigid outer bearing portions adjacent the ends of said pins to bear against the inner faces of said holes.

10. In yieldable shaft couplings, cast metal coupling members adapted to be connected to shafts and formed with a series of enlarged coöperating recesses, bearing metal linings cast into and retained in said recesses and forming a series of alined coöperating holes in said members and resilient coupling pins arranged in said holes.

11. In yieldable shaft couplings, coupling members adapted to be connected to shafts, there being a series of rectangular sectioned coöperating holes in said members, and removable resilient coupling pins disengageably arranged in said holes to bridge across between adjacent coupling members and each comprising a series of leaf springs and relatively rigid outer bearing plates connected together adjacent the ends of said pins to form relatively flat bearing surfaces bearing against the opposite faces of each of said holes.

12. In yieldable shaft couplings, coupling members adapted to be connected to shafts, there being a series of rectangular sectioned coöperating holes in said members and resilient coupling pins disengageably arranged in said holes to bridge across between adjacent coupling members and each comprising a series of leaf springs and relatively rigid outer bearing members connected adjacent the ends of said pins to form relatively flat bearing surfaces bearing against the opposite faces of each of said holes.

13. In yieldable shaft couplings, an integral replaceable resilient coupling pin comprising a series of leaf springs and relatively rigid separate bearing plates having flat contact faces permanently connected to said springs on both sides of the same to form a substantially rectangular sectioned bearing portion adjacent both ends of said pin.

ROBERT A. SMITH.